Figure 1:
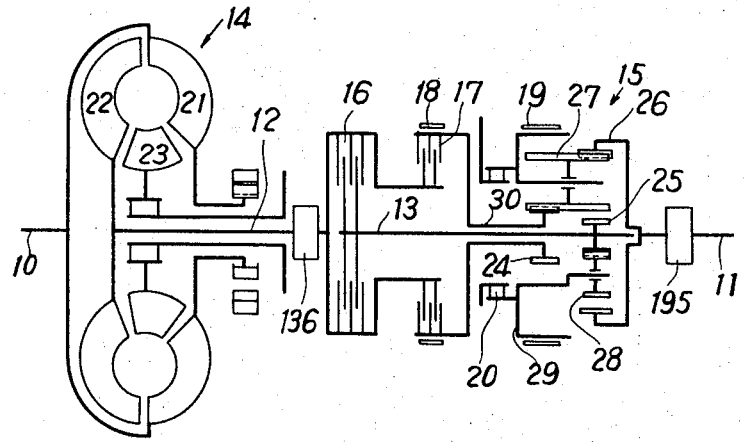

United States Patent

[11] 3,583,259

| [72] | Inventor | Tetsuo Shimosaki |
| --- | --- | --- |
| | | Hiroshima-ken, Japan |
| [21] | Appl. No. | 868,868 |
| [22] | Filed | Oct. 23, 1969 |
| [45] | Patented | June 8, 1971 |
| [73] | Assignee | Toyo Kogyo Co., Ltd. |
| | | Hiroshima-ken, Japan |
| [32] | Priority | Oct. 30, 1968, Oct. 31, 1968, Oct. 31, 1968, Oct. 31, 1968 |
| [33] | | Japan |
| [31] | | 43/79418, 43/79509, 43/79510 and 43/80030 |

[54] AUTOMATIC TRANSMISSION CONTROLS FOR USE IN AN AUTOMOTIVE VEHICLE
14 Claims, 5 Drawing Figs.

| [52] | U.S. Cl. | 74/864, 74/869 |
| --- | --- | --- |
| [51] | Int. Cl. | B60k 21/10 |
| [50] | Field of Search | 74/863, 864, 868, 869 |

[56] References Cited
UNITED STATES PATENTS

| 2,950,629 | 8/1960 | Holdeman et al. | 74/863 |
| --- | --- | --- | --- |
| 3,004,447 | 10/1961 | Sand | 74/868 |
| 3,053,116 | 9/1962 | Christenson et al. | 74/868X |
| 3,167,970 | 2/1965 | Wagner et al. | 74/868X |

*Primary Examiner*—Arthur T. Mckeon
*Attorney*—Craig, Antonelli, Stewart and Hill

ABSTRACT: A control mechanism in the transmission for use in an automotive vehicle, comprising a regulator valve for regulating fluid under pressure supplied from the fluid source to the servomotors in accordance with the engine torque signal, an exhaust valve to be operated in accordance with the driven shaft speed signal for modifying a value of said fluid when the vehicle is driven in a predetermined speed, and a reducing valve for reducing a pressure of said fluid so as to be modified only by the engine torque signal.

FIG. 2A

FIG. 2B

AUTOMATIC TRANSMISSION CONTROLS FOR USE IN AN AUTOMOTIVE VEHICLE

This invention relates to automatic transmission controls for use in an automotive vehicle, and more particularly to an automatic transmission control system for controlling the flow of fluid applied to friction clutches or brakes for establishing the various driving gear ratios of the transmission.

It is an object of the present invention to provide means for regulating fluid pressure or line pressure to be applied to friction engaging devices including friction clutches and brakes, at a high value when an automotive vehicle is driven at low speed and at a low value when said vehicle is driven at high speed.

It is another object of the invention to provide, in an automatic transmission having a torque converter, means for regulating line pressure at a high value when the torque conversion in said torque converter is large and at a low value when it is small.

It is further object of the invention to provide means including a regulator valve effective to control line pressure to be applied to friction engaging devices including clutches and brakes in response to the change of the engine torque signal and operable to apply said line pressure as an engine torque signal to one end of a shift valve to cause the shift valve to switch on and off together with a driven speed signal applied from the opposite direction thereof.

It is yet another object of the invention to provide means for applying a negative pressure in an intake manifold to said regulator valve to modify the line pressure in proportion to the torque output of the engine and thereby to supply the line pressure thus modified to the friction engaging devices for establishing the various driving gear ratios and also to apply it to the shift valve in opposition to the driven speed signal.

It is yet further object of the invention to provide means comprising a plurality of fluid sources and a cut-back valve effective to communicate one of said fluid sources with an oil reservoir to modify the characteristic of the line pressure regulated by the regulator valve when an automotive vehicle is driven to exceed a predetermined speed.

It is still another object of the invention to provide, in the control means effective to apply the line pressure responsive to the engine torque signal acting against the driven speed signal of the shift valve, a control valve effective to prevent the regulator valve from being effected by other signals such as driven speed signal than the engine torque signal to be applied to the regulator valve so that line pressure to be applied to the shift valve may be maintained at a value proportional to the engine torque signal.

It is still a further object of the invention to provide a control valve effective to control the flow of fluid to be supplied to the shift valve in the suitable condition in such a manner as to reduce fluid pressure regulated by applying negative pressure in the intake manifold as an engine torque signal, in a predetermined value of the opening of the accelerator pedal and to reduce the amount of reduction thereof when the degree of the opening of the accelerator pedal exceeds a predetermined value.

It is another object of the invention to provide, in a control device for establishing a plurality of power trains, for example a reverse drive power train and low speed forward drive power train, by means of engagement of specific combination of servomotors, control means for reducing an amount of supply of fluid thereto when either one of said power trains is established rather than when the rest of said power trains is established.

Figure 2:
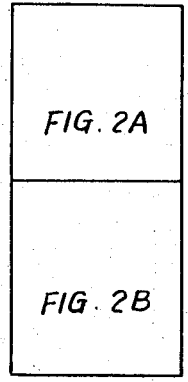
Figure 2A:
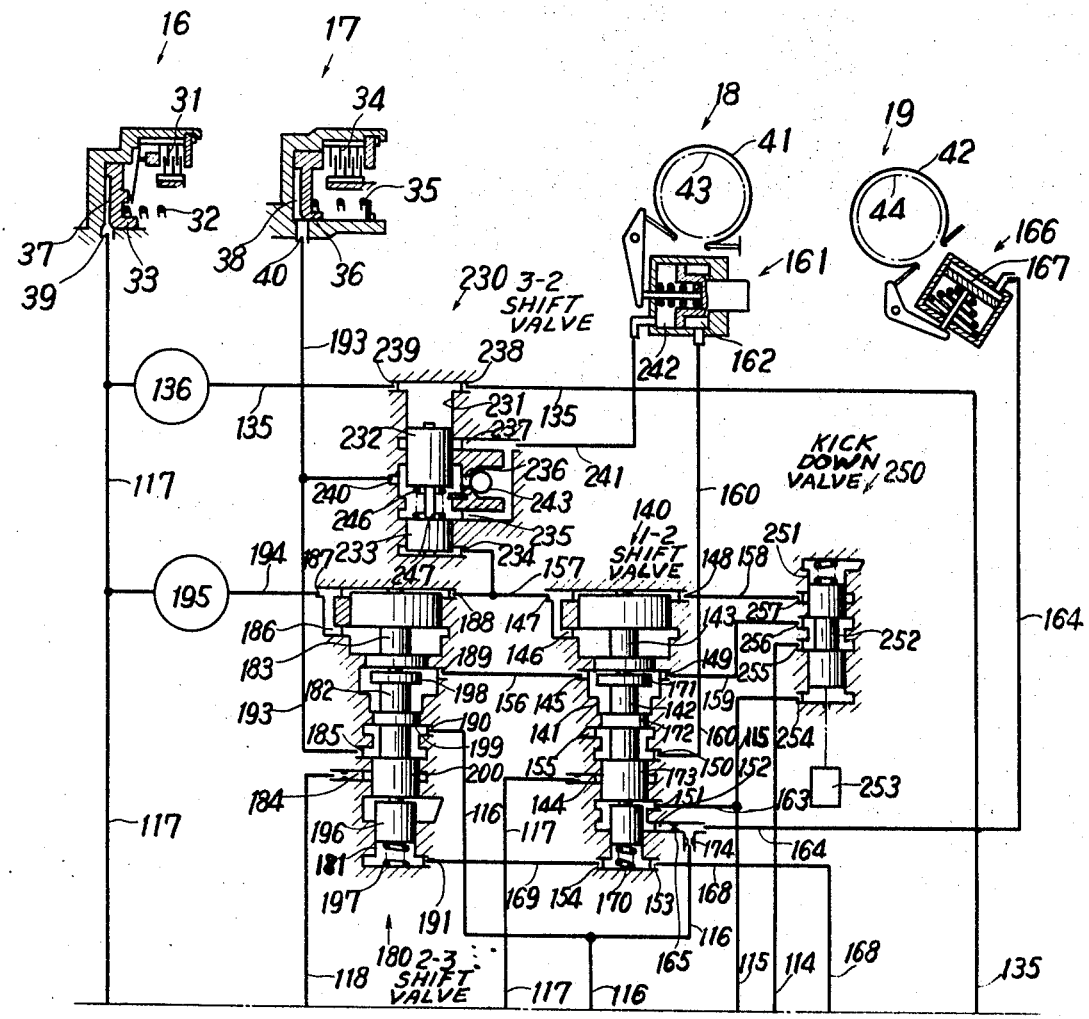
Figure 2B:
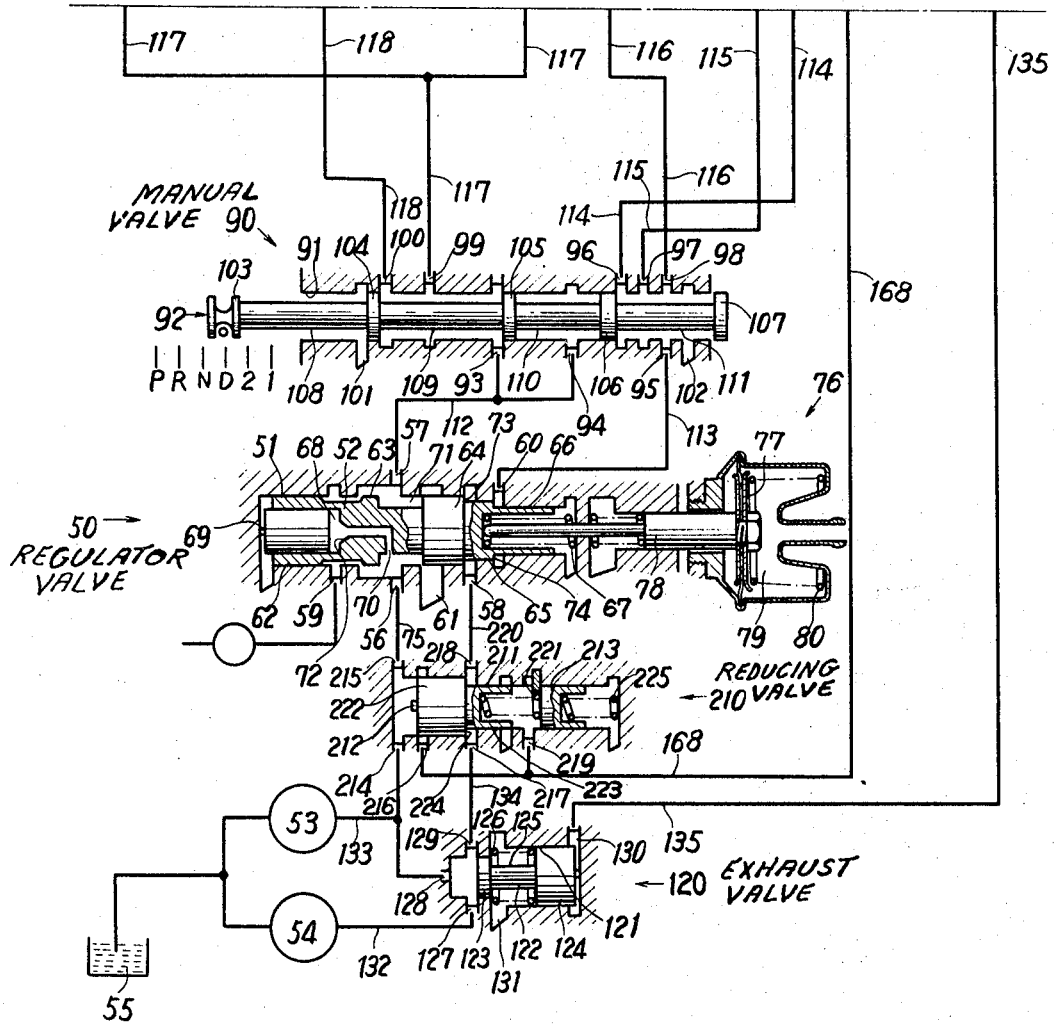
Figure 3:
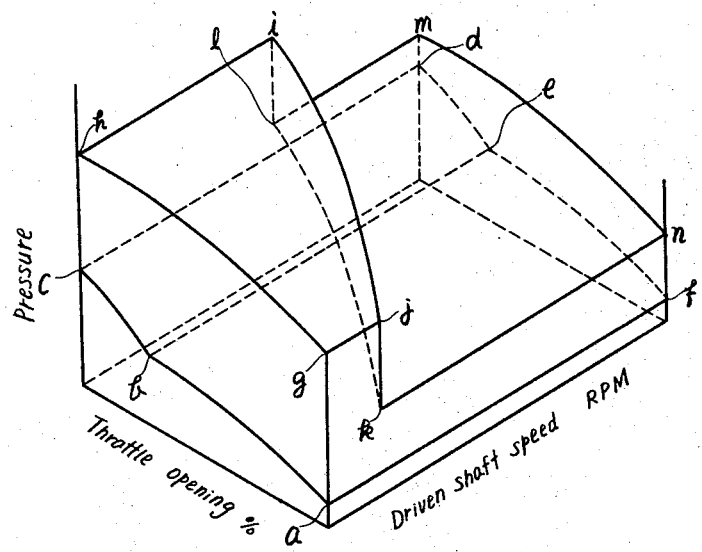

These and other objects, features and advantages of the present invention will become more apparent from the following detailed description of the invention when taken with the accompanying drawings, and wherein:

FIG. 1 is a schematic diagram of a transmission;
FIG. 2 is a reference layout diagram for combining FIGS. 2A and 2B;
FIGS. 2A and 2B show a schematic diagram of the complete control system for the transmission in accordance with the invention showing essential parts in section; and
FIG. 3 is a graph illustrating the line pressure to be applied to friction engaging devices as functions of the driven shaft speed and the throttle valve opening.

Referring now to FIG. 1, a transmission provided with the improved control system of the present invention comprises a drive shaft 10, a driven shaft 11, a first intermediate shaft 12, and a second intermediate shaft 13, all of said shafts being coaxially aligned and rotatably disposed within a transmission casing. The transmission also comprises a torque converter 14, a planetary gear set 15, a front clutch 16, a rear clutch 17, a front brake 18, a rear brake 19, and a one-way clutch 20. The torque converter 14 comprises an impeller 21, a turbine 22, and a stator 23.

The planetary gear set 15 comprises a front sun gear 24, a rear sun gear 25, a ring gear 26, a plurality of long pinion gears 27, a plurality of short pinion gears 28, and a gear carrier 29. The front sun gear 24 is formed integrally on a sleeve shaft 30 and the rear sun gear 25 is formed integrally on the second intermediate shaft 13.

The ring gear 26 is splined to the driven shaft 11. Both of said sun gears 24 and 25 are adapted to be driven by the first intermediate shaft 12. The rear sun gear 25 is driven by the shaft 12 when the front clutch 16 is engaged, and the front sun gear 24 is driven by the shaft 12 when the rear clutch 17 is engaged.

The front clutch 16 comprises a plurality of friction plates 31, a spring 32, and a piston 33, and the rear clutch 17 comprises a plurality of friction plates 34, a spring 35, and a piston 36. The piston 33 is slidably disposed within a cavity 37 and is adapted to engage the clutch 16 when fluid under line pressure is supplied to the cavity 37 through a port 39 and to disengage the clutch 16 by means of the spring 32 when said fluid pressure is released; and the piston 36 is slidably disposed within a cavity 38 and is adapted to engage the clutch 17 when fluid under line pressure is supplied to the cavity 38 through a port 40 and to disengage the clutch 17 by means of the spring 35 when said fluid pressure is released.

The front brake 18 comprises a friction band 41 adapted to be frictionally engaged to and disengaged from the peripheral surface of a drum 43 integrally formed with the sleeve shaft 30 and the rear brake 19 comprises a friction band 42 adapted to be frictionally engaged to and disengaged from the peripheral surface of a drum 44 integrally formed with the gear carrier 29.

The illustrated transmission provides low, intermediate, and high speed forward drives and a reverse drive. When both clutches 16 and 17 and brakes 18 and 19 are disengaged, the transmission is in neutral so that no driving torque is transmitted from the drive shaft 10 to the driven shaft 11.

When the clutches and brakes are engaged in a manner as summarized and tabulated below, the various driving gear ratios can be obtainable.

| Speed ratio | Front clutch | Rear clutch | Front brake | Rear brake | Oneway clutch |
|---|---|---|---|---|---|
| Low | X | | | | X |
| Intermediate | X | | X | | |
| High | X | X | | | |
| Reverse | | X | | X | |
| Lock-up low | X | | | X | |

NOTE: X marks indicate engagement.

The improved control system of the present invention for the transmission hereinbefore described with reference to FIG. 1 comprises various valves each of which will be hereinafter fully described with reference to FIGS. 2A and 2B.

"Regulator Valve"

The regulator valve 50 comprises a piston 52 slidably disposed within a cylinder 51 and has functions to regulate the fluid pressure supplied from a reservoir 55 by first and second pumps 53 and 54 at a predetermined value. The cylinder 51 is provided with ports 56 to 60 and a discharge port 61. The valve piston 52 is provided with lands 62 to 64, a land 65 of a smaller diameter than that of said lands 62 to 64, and a land 66 of a smaller diameter than that of said land 65, and normally biased to the left under the influence of the resilient force of a spring 67.

The piston 52 is also provided with a cavity 68 having an auxiliary piston 69 slidably disposed within said cavity 68. Said cavity 68 is communicated through an orifice 70 with an annular groove 71 formed between the lands 63 and 64 so that, when fluid under pressure is supplied into said cavity 68 through a conduit 75 and subsequently acts on a pressure receiving surface 72, the piston 52 is pressed to the right against the spring 67. Between lands 64 and 65, and lands 65 and 66, stepped portion 73 and 74 are respectively provided so that, when fluid pressure is applied thereto, the piston 52 is pressed to the left. The regulator valve 50 includes a vacuum motor 76 arranged at the right-hand side thereof so as to contact the piston 52 with a push rod 78 secured to a diaphragm 77 in said vacuum motor 76.

In this construction the regulator valve 50 functions to regulate the flow of fluid under pressure from the conduit 75 to increase in response to the engine torque signal, namely, with decrease of a value of negative pressure, by means of the resilient force of the spring 67 and the pressing force of a spring 80 variable with change of a value of negative pressure within a negative pressure chamber 79 communicated with a manifold (not shown).

"Manual Valve"

The manual valve 90 comprises a piston 92 slidably disposed within a cylinder 91 and is used to select the various driving conditions. The cylinder 91 is provided with ports 93 to 100 and discharge ports 101 and 102. The piston 92 is provided with lands 103 to 107 and annular grooves 108, 109, 110, and 111 between said lands 103 to 107.

The port 93 is connected to the port 94 through a conduit 112; the port 95 is connected to the port 60 of the regulator valve 50 through a conduit 113; the port 96 is connected to a conduit 114; the port 97 is connected to a conduit 115; the port 98 is connected to a conduit 116; the port 99 is connected to a conduit 117; and the port 100 is connected to a conduit 118.

The piston 92 is adapted to be moved longitudinally into any one of six selective positions such as P for parking position, R for reverse drive, N for neutral, D for forward automatic shifting range, 2 for intermediate speed lock-up range, and 1 for low speed lock-up range.

"Exhaust Valve"

The exhaust valve 120 comprises a piston 122 slidably disposed within a cylinder 121. The piston 122 is provided with lands 123 and 124 and an annular groove 125 between said lands 123 and 124 and normally biased to the right under the influence of the resilient force of a spring 126. The cylinder 121 is provided with ports 127 to 130 and a discharge port 131. The port 127 is connected to the second pump 54 through a conduit 132; the port 128 is connected to the first pump 53 through a conduit 133; the port 129 is connected to a conduit 134; and the port 130 is connected to a conduit 135. The conduit 135 is in turn connected with a first governor valve 136 drivingly connected with the first intermediate shaft 1 2 and operable in such a manner as to develop fluid pressure, namely, first governor pressure, responsive to the rotational speed of the first intermediate shaft 12. Accordingly, the exhaust valve piston 122 is in a right-hand position as illustrated in FIG. 2B when a value of the first governor pressure is less than the predetermined value; and in a left-hand position when a value thereof is more than the predetermined value.

When the piston 122 is in the right-hand position, the ports 127 to 129 are communicated each other and fluid developed respectively by the pumps 53 and 54 flows into the cylinder 121 through the conduit 133 and 132, which is in turn supplied to the stepped portion 73 of the regulator valve 50 through the conduits 134 and 220 across a compensator valve 210 to be hereinafter described, resulting in that the piston 52 of the regulator valve 50 is pressed to the left. On the contrary, when the piston 122 is in the left-hand position, the ports 127 and 129 are closed off from their respective communication with the port 128 while communicated with the discharge port 131, resulting in that the fluid developed by the pump 54 and supplied through the conduit 132 and fluid in the conduit 134 are respectively returned to the reservoir 55 through the discharge port 131. Thus, line pressure in the conduit 75 and the conduit 112 is maintained at a high value if the first governor pressure is of a value less than the predetermined value and at a small value if the first governor pressure is of a value more than the predetermined value.

Since a value of fluid pressure necessary to operate the clutches and brakes is to decrease in accordance with decrease of torque conversion, for example with increase of the rotational speed of the first intermediate shaft 12 in the torque converter, by maintaining the line pressure at the maximum value in the stalled condition and at the minimum value where the torque conversion is small, respective engagement of the clutches and brakes can be smoothly performed and pumping losses of the pumps can be also reduced, and moreover the Bernoulli force occurring within the regulator valve 50 can be minimized. The Bernoulli force occurring within the regulator valve 50 may give a wrong effect on the pressure regulating characteristic of the regulator valve; on that occasion, a negative pressure occurs around the valve piston 52 upon discharge of surplus fluid through the discharge port 61, and thereby the valve piston 52 moves in one direction. In addition thereto, the Bernoullie force may become great as an amount of fluid to be discharged through the discharge port 61 increases. For these reasons, the transmission of the conventional type wherein the line pressure is to be reduced with increase of the amount of the fluid to be discharged has an inaccuracy in regulating the line pressure.

However, in the arrangement of the present invention, by discharging all of fluid supplied by the second pump 54 through the discharge port 131 while the piston 122 of the exhaust valve 120 is in the left-hand position, an amount of fluid to be discharged from the regulator valve 50 is reduced resulting in a reduction of the wrong effect of the Bernoulli force. Furthermore, since line pressure effective to increase its value in accordance with decrease in value of the negative pressure is applied on the left end surface of the piston 122 so as to press the piston 122 to the right, the shift-over point of the piston 122 from the right to the left becomes high in speed of drive shaft in accordance with increase of the negative pressure.

"1-2 Shift Valve"

The 1-2 shift valve 140 comprises a first piston 142 and a second piston 143, both slidably disposed within a cylinder 141. The cylinder 141 is provided with ports 144 to 154 and a discharge port 155. The port 144 is connected to a conduit 117; the port 145 is connected to a conduit 156; the port 146 is connected to the port 147 and a conduit 157; the port 148 is connected to a conduit 158; the port 149 is connected to a conduit 159; the port 150 is connected through a conduit 160 to an apply chamber 162 of a first servomotor 161; the port 151 is connected to a conduit 163; the port 152 is connected to an apply chamber 167 of a second servomotor 166 through a conduit 164 having an orifice 165 thereon; the port 153 is connected to a conduit 168; and the port 154 is connected to a conduit 169.

The first piston 142 is provided with lands 171 to 173 and normally biased to the upper side under the influence of the resilient force of a spring 170. The first piston 142 is adapted to be moved any any one of two selective positions, one of which is the low speed drive position and the other of which is the high speed drive position. When the piston 142 is in the low speed drive position, communication between the port 144 and the port 150 is closed by the land 173 and, when said piston is in the high speed drive position, the ports 144 and 150 are communicated to each other. The conduit 164 is connected with the conduit 116 through an orifice 174.

"2-3 Shift Valve"

The 2-3 shift valve 180 comprises a first piston 182 and a second piston 183, both slidably disposed within a cylinder 181. The cylinder 181 is provided with ports 184 to 191. The port 184 is connected to the conduit 118; the port 185 is connected to a conduit 193; the port 186 and the port 187 are connected to a second governor valve 195 through a conduit 194, said second governor valve 195 being driven by the driven shaft 11 to develop fluid pressure, namely second governor pressure, responsive to the rotational speed of the driven shaft 11; the port 188 is connected to the conduit 157; the port 189 is connected to the conduit 156; the port 190 is connected to the conduit 116; and the port 191 is connected to the conduit 169.

The first piston 182 is provided with lands 198 to 200 and is normally biased to the upper side under the influence of the resilient force of a spring 197 through a plug 196. The first piston 182 is adapted to be moved into any one of two selective positions, one of which is the low speed drive position where the ports 185 and 190 are communicated to each other with closure of communication between the ports 184 and 185 by the land 200, and the other of which is the high speed drive position where the ports 184 and 185 are communicated to each other with closure of the port 190 by the land 199.

"Reducing Valve"

The reducing valve 210 comprises a piston 212 and a plug 213, both slidably disposed within a cylinder 211. The cylinder 211 provided with ports 214 to 219. The port 214 is connected to the conduit 133; the port 215 is connected to the conduit 75; the port 216 is connected to the conduit 168; the port 217 is connected the conduit 134; the port 218 is connected with a conduit 200; and the port 219 is connected with the conduit 168. The piston 212 is normally biased to the left under the influence of the resilient force of a spring 221 and is provided with a land 222, a land 223 of a smaller diameter than said land 222 and a stepped portion 224 between said lands 222 and 223. The plug 213 is normally biased under the influence of the resilient force of a spring 225 so as to abut on a stopper provided in the cylinder 211. In other words, the spring 225 is interposed between a right-hand end of the plug 213 and an end wall of the cylinder 211 so that the plug 213 may move to the right as the pressing force acting on the left-hand end of the plug 213 exceeds a predetermined value.

In this construction, fluid under line pressure supplied through the port 214 acts on the left-hand end of the piston 212 to move the piston 212 to the right and in turn flows through the port 216 to the conduit 168. The fluid under line pressure thus supplied in the conduit 168 then flows into the cylinder 211 through the port 219 to press the piston 212 to the left and also to press the plug 213 to the right. If at this time the exhaust valve 120 is in the condition as illustrated in FIG. 2B and the plug 213 is positioned as illustrated with a value of line pressure acting on the left-hand end of the piston 212 less than the predetermined value, fluid pressure in the conduit 168 will act on the right-hand end of the piston 212 and will be then reduced in a predetermined amount under the balance of two pressing forces, one of which is to act on the left-hand end of the piston 212 to press said piston to the right and the other of which is to act on the right-hand end of the piston 212 to press said piston to the left by means of the spring 221 together with fluid pressure acting on the stepped portion 224 and the right-hand end of the piston 212. Then, the fluid under pressure is supplied as a compensator line pressure, to the port 153 of the 1-2 shift valve 140 through the conduit 168, which is in turn supplied through the conduit 169 to the port 191 of the 2-3 shift valve 180. At this time, in response to the compensator line pressure as an engine torque signal, the first pistons 142 and 182 of the 1-2 shift valve 140 and the 2-3 shift valve 180 are respectively pressed to the upper side. In this state, if the manifold negative pressure decreases below the predetermined value and subsequently the line pressure in the conduit 75 and the conduit 112 exceeds over the predetermined value resulting in that the pressing force for pressing the plug 213 to the right by means of fluid under pressure acting on the left-hand end of the plug 213 becomes greater than the pressing force for pressing the plug 213 to the left by means of the spring 225, the plug 213 is moved to the right and the pressing force for pressing the piston 212 to the left by means of the spring 221 is subsequently reduced. For this reason, the amount of reduction of the line pressure decreases in accordance with increase of displacement of the plug 213 in the right-hand direction with the result of increase of the variation ratio of the compensator line pressure in the conduit 168. Accordingly, optimum shift patterns can be obtained by applying the compensator line pressure to each of the shift valves 140 and 180 as an engine torque signal.

If fluid under pressure to be supplied to the shift valves 140 and 180 as an engine torque signal is regulated by the manifold negative pressure, a value of the fluid pressure does not greatly vary in the high opening range of the throttle valve of the carburetor. Therefore, the speed range in the low speed drive gear is defined narrowly so that the driver will feel uncomfortable in riding quality.

However, in the present invention, since as an engine torque signal, the fluid pressure in proportion to a valve of the manifold negative pressure is reduced in a predetermined amount while the opening of the throttle valve is of less than a predetermined value and since the amount of reduction of said fluid pressure decreases slowly while the opening of the throttle valve is of more than the predetermined value with the result of increase of the variation ratio of said engine torque signal, adequate shift patterns whereby the driver will feel comfortable in riding quality can be obtained.

In addition, even if the piston 122 of the exhaust valve 120 is moved to the left or right depending upon variation of the first governor pressure and subsequently the line pressure in the conduits 75 and 112 varies with variation of vehicle drive speed, the fluid under pressure in the conduit 168 merely responds to the variation of the negative pressure relative to the line pressure so as to be maintained at the area defined by $a$-$b$-$c$-$d$-$e$-$f$ as shown in FIG. 3, resulting in that said fluid pressure as an engine torque signal accurately operates each of the shift valves.

In other words, since a ration of the left-hand pressure receiving area of the piston 212 to the pressure receiving area of the stepped portion 224 is provided equal to a ration of the pressure receiving area 72 of the regulator valve piston 52 to the pressure receiving area of the stepped portion 73, even if the line pressure applied on the stepped portion 73 of the regulator valve piston 52 is discharged into the reservoir 55 and then the line pressure in the conduits 75 and 112 is subsequently reduced from a certain point on the area defined by $g$-$h$-$i$-$j$ in FIG. 3 to a certain point on the area defined by $k$-$l$-$m$-$n$ in FIG. 3, the fluid under pressure in the conduit 168 is reduced in an amount corresponding to the amount of reduction of the line pressure by means of discharging the line pressure applied on the stepped portion 224 of the reducing valve piston 212 into the reservoir 55, and said fluid pressure in the conduit 168 is maintained up to a certain point on the area defined by $a$-$b$-$c$-$d$-$e$-$f$ in FIG. 3 regardless of the vehicle driving speed.

"3-2 Down-Shift Valve"

The 3-2 down-shift valve 230 comprises a first plug 232 and a second plug 233, both slidably disposed within a cylinder 231. The cylinder 231 is provided with ports 234 to 240. The port 234 is connected to the conduit 157; the port 235 is connected through a conduit 241 to a release chamber 242 of the first servomotor 161; the port 236 is connected to the conduit 241 through a check valve 243; the port 237 is connected to the conduit 241; the port 238 and the port 239 are connected to the conduit 135; and the port 240 is connected to the conduit 193. Between the first and second plugs 232 and 233 a spring 246 is interposed.

The first plug 232 is provided with a projecting rod 247 for regulating its relative position to the second plug 233. The upper end of the first plug 232 and the lower end of the second plug 233 are respectively to be applied with a first governor pressure and a second governor pressure so as to establish or obstruct the intercommunication of the port 240 to the ports 235, 236, and 237 under the influence of said governor pressures. The first plug 232 is moved to the extreme upper side by means of the spring 246 so as to communicate between the ports 240 and 237 if a value of fluid pressure or first governor pressure from the first governor 136 is less than the predetermined value, while if the value of the first governor pressure is more than the predetermined value, the first plug 232 is moved to close the port 237. On the other hand, the second plug 233 is moved upwardly to close the port 235 under the influence of the second governor pressure when said plug 233 is shifted from the intermediate speed drive position to the high speed drive position, and, upon descent of the first plug 232, is moved downwardly with the result of communication between the ports 235 and 240 when the piston 183 of the 2-3 shift valve 180 is downshifted from the high speed drive position to the low speed drive position and the rear clutch 17 is released to establish the transmission in the neutral condition and thereby to render the rotational speed of the first intermediate shaft 12 to increase sufficiently enough to cause the first governor pressure to arrive at the predetermined value.

"Kick-down Valve"

The kick-down valve 250 comprises a piston 252 slidably disposed within a cylinder 251. The piston 252 is connected with a solenoid 253 to be operated on and off by means of an accelerator pedal. The cylinder 251 is provided with ports 254 to 257. The port 254 is connected to the conduit 115; the port 255 is connected to the conduit 114; the port 256 is connected to the conduit 159; and the port 257 is connected to the conduit 158. The piston 252 is adapted to be moved into any one of two selective positions, one of which is the normal position and the other of which is the kick-down position. When the piston 252 is in the normal position, communication between the ports 256 and 257 is closed as illustrated in FIG. 2A; and when in the kick-down position, the ports 256 and 257 are communicated to each other.

"Operation"

When the first pump 53 and the second pump 54 are respectively operated to develop fluid into the conduits 133 and 132 while the arrangement of the devices for the transmission of the present invention is in the illustrated condition in FIGS. 2A and 2B, said fluid is supplied to the port 56 of the regulator valve 50 through the ports 215 and 214 of the reducing valve 210, and conduit 75. At the same time, said fluid is supplied to the port 217 of the reducing valve 210 from the port 129 of the exhaust valve 120 through the conduit 134 and then to the port 58 of the regulator valve 50 through the conduit 220. Said fluid under pressure or line pressure thus developed by the first and second pumps 53 and 54 to the regulator valve 50 will increase its value with decrease in value of the negative pressure by the balance between the pressing force due to the fluid pressure acting on the pressure receiving surface 72 of the piston 52 for pressing said piston 52 in the right-hand direction and the combined force consisting of the pressing force of the push rod 78 varying with variation of a value of the negative pressure, resilient force of the spring 67 and the pressing force of fluid pressure acting on the stepped portion 73 for pressing the piston 52 in the left-hand direction. Thus, said fluid under pressure or line pressure is maintained to a certain point on the area defined by $g$-$h$-$i$-$j$ in FIG. 3, and then supplied to the ports 93 and 94 of the manual valve 90 through the conduit 112.

On the other hand, fluid supplied to the reducing valve 210 for pressing the piston 212 in the right-hand direction is to flow into the conduit 168 after the piston 212 is moved to the right thereby. However, when the line pressure to be applied on the left-hand end of the piston 212, namely, an amount of depression of the accelerator pedal operated by the vehicle driver, is less than the predetermined value, the line pressure in the conduit 168 is maintained as represented by $a$-$b$ in FIG. 3 under the balanced condition between the pressing force due to the line pressure acting on the left-hand end of the piston 212 to press it in the right-hand direction and the combined force consisting of fluid pressure acting on the stepped portion 224 and the right-hand end of the piston 212 and the resilient force of the spring 221 for pressing the piston 212 in the left-hand direction. On the contrary, when the line pressure to be applied on the left-hand end of the piston 212, namely, an amount of depression of the accelerator pedal operated by the vehicle driver, is more than the predetermined value, the plug 213 is moved to the right against the resilient force of the spring 225 so as to decrease the resilient force of the spring 221 for pressing the piston 212 in the left-hand direction in accordance with increase in value of the line pressure with the result that the line pressure in the conduit 168 is reduced, as represented by $b$ to $c$ in FIG. 3, and then in turn applied to the 1-2 shift valve 140 and the 2-3 shift valve 180 as a compensator line pressure variable a value with the engine torque signal so as to press the pistons 142 and 182 upwardly.

In addition thereto, said compensator line pressure can be maintained at a constant value as represented by $a$-$f$ in FIG. 3 regardless of the rotational speed of the first intermediate shaft 12 under a particular degree of depression, e.g., full depression of the accelerator pedal. The reason therefor is because, even if a value of line pressure is reduced from the level as represented by $g$-$h$-$i$-$j$ in FIG. 3 to the level as represented by $k$-$l$-$m$-$n$ in FIG. 3, the pressing force due to the line pressure acting on the stepped portion 224 for pressing the piston 212 in the left-hand direction is reduced. In other words, even if variation of a value of the line pressure due to the rotational speed of any one of the control elements such as parts of the torque converter other than the engine torque signal occurs, the compensator line pressure can be maintained at the level as represented by $a$-$b$-$c$-$d$-$e$-$f$ in FIG. 3 regardless of said occurrence of the variation of the line pressure, resulting in that said compensator line pressure is applied to any one of the shift valves as an accurate engine torque signal.

In this condition, when the piston 92 of the manual valve 90 is operated to the D-position as illustrated in FIG. 2B and thereby to communicate the port 93 with the ports 99 and 100, the line pressure applied through the conduit 112 flows through the conduit 117 to the port 144 of the 1-2 shift valve 140 and through the conduit 118 to the port 184 of the 2-3 shift valve 180 and in part to the cavity 37 of the front clutch 16. Thus, the front clutch 16 is engaged and the drive power from the engine is transmitted to the rear sun gear 25 in sequence of the drive shaft 10, the torque converter 14, the first intermediate shaft 12, and the second intermediate shaft 13, thereby rotating the short pinion gears 28 and the long pinion gears 27 to lock up the gear carrier 29 by means of the one-way clutch 20, resulting in the power transmission from the drive shaft 10 to the driven shaft 11 through the ring gear 26. Namely, low speed forward drive is obtained by engaging the front clutch 16 and the oneway clutch 20.

When the second governor pressure applied from the second governor valve 195 arrives at a value sufficient enough to cause the first piston 142 and second piston 143 of the 1-2 shift valve 140 to respectively move downward against the resilient force of the spring 170 and the compensator line pressure while the vehicle is in the low speed forward drive, the first and second pistons 142 and 143 commence to downwardly move. When during downward movement of the piston 143, the port 146 is closed by the land of a larger diameter thereof and the second governor pressure in the annular groove between said land and the land of a smaller diameter is fed from the port 149 to the port 256 of the kickdown valve 250 through the conduit 159 and then from the port 255 thereof to the port 96 communicating with the discharge port 102 of the manual valve 90 through the conduit 114 so that said fluid is discharged from the port 149 to the discharge port 102 in the manual valve 90, the pressing force for pressing the pistons 142 and 143 in the downward direction actually increases to move the pistons 142 and 143 promptly into the high speed drive position. Accordingly, as said pistons are in the high speed drive position, the ports 144 and 150 are communicated to each other so that fluid under pressure supplied from the conduit 117 is then supplied to the first servomotor 162 through the conduit 160 to engage the front brake 18. Thus, intermediate speed forward drive can be obtained thereby.

When the second governor pressure arrives at the predetermined value upon the further increase of the vehicle drive speed while the vehicle is in the intermediate speed forward drive, the first piston 182 of the 2-3 shift valve 180 is moved downwardly into the high speed drive position, a s in the case of the 1-2 shift valve 140, to communicate the port 184 with the port 185. Then, fluid under pressure supplied from the conduit 118 flows in part to the cavity 38 of the rear clutch 17 through the conduit 193 to engage the rear clutch 17 and in part to the port 240 in the 3-2 down-shift valve 230 through the conduit 193. The fluid supplied to the port 240 is in turn supplied from the ports 235 and 236 of the 3-2 down-shift valve 230 to the release chamber 242 of the first servomotor 161 through the conduit 241 to disengage the front brake 18. Thus, high speed forward drive can be obtained by engagement of the clutch 17 and disengagement of the front brake 18.

When the establishment of high speed forward drive is completed, the pressure ratio between the first governor pressure and the second governor pressure changes as compared with that of the intermediate speed forward drive whereupon the pressing force due to the first governor pressure for pressing the second plug 233 in the downward direction becomes smaller than the pressing force due to the second governor pressure for pressing the same in the upward direction then the second plug 233 is moved upwardly to close the port 235.

Hereinafter operation of down-shift from high speed forward drive to intermediate speed forward drive will be described:

When full depression of the accelerator pedal to its limit for the purpose of exciting the solenoid 253 to permit the piston 252 of the kick-down valve 250 to be moved upwardly and thereby to communicate the ports 257 and 256 with each other is performed while the vehicle in the high speed forward drive is ready to be down-shifted from high speed drive to intermediate speed drive, fluid under second governor pressure supplied through the conduit 158 is in turn supplied from the ports 257 and 256 through the conduit 159 to the port 149 of the 1-2 shift valve 140 and then into the cylinder 141 so as to press the upper end of the land 171 of the first piston 142 and the lower end of the second piston 143 and subsequently from the port 145 of the 1-2 shift valve 140 through the conduit 156 to the port 189 of the 2-3 shift valve 180 and then into the cylinder 181 so as to press the upper end of the land 198 of the first piston 182 and the lower end of the second piston 183. As the pressing force for pressing the first piston 182 of the 2-3 shift valve 180 in the downward direction is reduced, the first piston 182 commences to move upwardly under the influence of fluid under throttle pressure and the resilient force of the spring 197 to communicate the port 185 with the port 190. Upon communication between the ports 185 and 190, line pressure within the cavity 38 of the rear clutch 17 is discharged from the discharge port 102 of the manual valve 90 through the conduit 193, said ports 185 and 190 of the 2-3 shift valve 180 and through the conduit 116, the port 98 of the manual valve 90, thereby to disengage the clutch 17. At this time, connection between the conduit 241 to the conduit 193 is interferred with by the second plug 233 of the 3-2 downshift valve 230 to maintain the front brake 18 in the disengaged condition, resulting in that the transmission of the present invention is established in the neutral condition.

When fluid under pressure from the first governor increases with increase of the vehicle engine speed to an extent that a ratio of the pressing force for pressing the first plug 232 in the downward direction under the influence of fluid under first governor pressure to the pressing force for pressing the second plug 233 in the upward direction under the influence of fluid under second governor pressure corresponds to a gearing ratio in the intermediate forward drive, the second plug 233 commences to move downwardly upon descent of the first plug 232 to communicate the ports 235 and 240 to each other. Therefore, line pressure applied in the release chamber 242 in the servomotor 161 is discharged from the discharge port 102 of the manual valve 90 through the conduit 241, said ports 235 and 240 of the 3-2 downshift valve 230, conduit 193, the ports 185 and 190 of the 2-3 shift valve 180, the conduit 116 and the port 98 of the manual valve 90, thereby to engage the front brake 18 resulting in that the intermediate speed forward drive can be obtained.

Operation of the manual valve 90 with its piston from the D-position to the 2-position will be hereinafter described.

When the manual valve 90 is operated with its piston from D-position to the 2-position the port 100 is communicated with the discharge port 101 to discharge fluid under line pressure in the conduit 118 therefrom and the port 96 is also communicated with the port 94 to supply fluid under line pressure to the conduit 114. Fluid under line pressure in the conduit 114 is supplied to the upper end of the first piston 142 and the lower end of the second piston 143 in the 1-2 shift valve 140 through the conduit 159, and the ports 256 and 257 of the kick-down valve 250, which is in turn supplied to the upper end of the first piston 182 and the lower end of the second piston 183 in the 2-3 shift valve 180 through the conduit 156, and the port 189 of the 2-3 shift valve 180.

In such a manner, the first pistons 142 and 182 respectively of the 1-2 shift valve 140 and the 2-3 shift valve 180 are maintained in the high speed drive position and the second pistons 143 and 183 respectively of the 1-2 shift valve 140 and the 2-3 shift valve 180 are maintained in the low speed drive position. However, if the high speed forward drive is established in respect of the transmission before such operation, fluid under line pressure in the conduit 193 is discharged from the discharge port 101 of the manual valve 90 through the conduit 118 while fluid under line pressure supplied from the conduit 117 through the conduit 160 acts to engage the front brake 181 to establish the intermediate speed forward drive. Subsequently after the intermediate speed forward drive is obtained, even though values of the vehicle drive speed and the engine torque output respectively vary accompanying variation of respective value of the second governor pressure and the compensator line pressure, the intermediate speed forward drive can be maintained in respect of the transmission of the present invention with the first piston 142 of the 1-2 shift valve 140 being in the high speed drive position under the influence of the line pressure.

The mode of operation of the transmission of the present invention when the piston of the manual valve is operated to position in the 1-position or lock-up low speed range will be hereinafter described.

When the piston of the manual valve 90 is in the 1-position, fluid under line pressure supplied from the conduit 112 is supplied to the conduits 117, 114, and 115 from the ports 93 and 94 of the manual valve 90 respectively through the ports 99, 96 and 97. Fluid under line pressure in the conduit 117 is in turn supplied in part to the cavity 37 of the front clutch 16 to engage the front clutch 16 and in part to the port 144 of the 1-2 shift valve 140; fluid in the conduit 115 is in turn supplied to the port 254 of the kick-down valve 250 to move the piston 252 therein to the upper side and thereby to cause fluid under second governor pressure from the conduit 158 to be supplied to the port 149 of the 1-2 shift valve 140 through the conduit 159, and the ports 257 and 256 so that the first piston 142 and the second piston 143 are respectively maintained in the low speed drive position as in the case of the kick-down operation; and fluid in the conduit 115 is in turn supplied to the conduit 164 through the conduit 163, and the ports 151 and 152 of the 1-2 shift valve 140. In this condition, since the conduit 116 is communicated with the discharge port 102 of the manual valve 90, rising of fluid under pressure in the conduit 164, experiences a delay in the increase of its value by the orifice 165; moreover since from the orifice 174 a predetermined amount of said fluid is discharged to the discharge port 102 of the manual valve 90 through the conduit 116, a predetermined pressure value of said fluid is reduced by said orifice 174, then is supplied to the apply chamber 167 of the second servomotor 166 to engage the rear brake 19, resulting in that the low speed forward drive can be obtained.

The mode of operation of the transmission of the present invention when the piston of the manual valve is operated to position in the R-position or reverse drive will be hereinafter described.

When the piston of the manual valve 90 is in the R-position, fluid under line pressure supplied from the conduit 112 is supplied to the conduit 116, 115, and 114 respectively through the ports 94, 96, 97 and 98 of the manual valve 90. Fluid under line pressure in the conduit 115 is in part supplied to the port 254 of the kick-down valve 250 to move the piston 252 in the upward direction and thereby to permit fluid under second governor pressure to flow into the 1-2 shift valve 140 through the conduit 158 and then into the 2-3 shift valve 180 through the ports 149 and 189 respectively to maintain the first pistons 142 and 182 at the respectively low speed driving position in such a manner similar to the piston of the manual valve 90 being positioned in the 1-position. The rest of the fluid under line pressure in the conduit 115 is supplied to the port 151 of the 1-2 shift valve 140 through the conduit 163 and then to the conduit 164 from the port 152. At this time, the conduit 164 is also supplied with fluid under line pressure through the conduit 116. Accordingly, a value of line pressure in the conduit 164 is somewhat reduced to delay the rising of line pressure by each of the orifices 165 and 174, but is to be applied to the apply chamber 167 of the second servomotor 166 with its value being increased up to the initial value as the time passes, resulting in that the rear brake 19 is engaged thereby.

Fluid under line pressure in the conduit 116 is supplied to the cavity 38 of the rear clutch 17 through the conduit 193, and the ports 190 and 185 of the 2-3 shift valve 180, thereby to engage the rear clutch 17. Accordingly, the reverse drive can be obtained by engaging the rear clutch 17 and the rear brake 19. Although the rear brake 19 must be engaged both in the reverse drive and the lock-up low forward drive, a force necessary to fasten the friction band 42 to the drum 44 of the rear brake 19 is greater in establishing the reverse drive than that in the lock-up low forward drive.

Therefore, in the transmission of the present invention, only if line pressure to be applied to the second servomotor 166 is maintained in a relatively greater value in the reverse drive than in the lock-up low forward drive, no shocks normally inherent to the establishment of the reverse drive and the low speed forward drive can occur during operation of the vehicle driving.

While a specific embodiment of the invention has been shown and described, it should be understood that certain alterations, modifications and substitutions may be made to the instant disclosure without departing from the spirit and scope of the invention as defined by the appended claims.

What I claim is:

1. A control mechanism in an automatic transmission for use in an automotive vehicle comprising
   a drive shaft,
   a driven shaft,
   means including hydraulically operable servomotors for establishing a power train between said drive shaft and driven shaft, and also including a shift valve effective to alternatively establish a low speed power train and a high speed power train in an automatic manner,
   at least two fluid sources for supplying fluid under pressure to said hydraulically operable servomotors,
   means for providing a first signal force, a value of which is variable with variation of the value of the engine torque signal,
   means connected to one of said shafts for providing a second signal force, a value of which is variable with variation in value of the shaft speed signal,
   a first valve means for regulating fluid from said fluid sources in such a manner as to increase a value of said fluid with increase in value of said first signal force under the influence of said first signal force,
   means including a second valve means for connection between said first valve means and said fluid sources so as to maintain a value of said fluid from the sources to the servomotors at an expected maximum value under the influence of said second signal force during operation of the vehicle within a predetermined speed range, and also for connection of one of said sources to an oil reservoir so as to maintain the value of the fluid at an expected minimum value during operation of the vehicle exceeding the predetermined speed range, and
   means including a reducing valve for connecting said first valve means and said shift valve and also reducing the pressure of fluid from said fluid sources, said reducing valve being operatively connected to said second valve and effective to modify the amount of said fluid to be reduced so that fluid under reducing pressure to be supplied to one end of said shift valve is proportioned to said first signal force.

2. A control mechanism in an automatic transmission for use in an automotive vehicle comprising:
   a drive shaft,
   a driven shaft,
   means including hydraulically operable servomotors for establishing a power train between said drive shaft and driven shaft, and also including a shift valve effective to alternatively establish a low speed power train and a high speed power train in an automatic manner,
   at least two fluid sources for supplying fluid under pressure to said hydraulically operable servomotors,
   a vacuum motor connected to a manifold in the engine for providing a first signal force, a value of which increases with decrease in value of negative pressure in said vacuum motor,
   means connected to one of said shaft for providing a second signal force, a value of which increases with increase in value of the vehicle driving speed,
   a regulator valve having a plurality of opposed pressure receiving surfaces and a valve piston in contact with said vacuum motor for regulating the pressure of fluid from at least one of the fluid sources so as to increase its value with decrease in value of the negative pressure,
   a first conduit connecting between one of said fluid sources and one of the pressure receiving surfaces of said regulator valve to permit fluid from said source to press a regulator valve piston in one direction upon application thereof, a second conduit connecting between the rest of said fluid sources and another one of the pressure receiving surfaces of said regulator valve to permit fluid from said source to press the regulator valve piston in the opposite direction thereof means including an exhaust valve for connecting between said first and second conduits so as to maintain a value of the fluid from said sources to said hydraulically operable servomotors at an expected maximum value under the influence of said second signal force during operation of the vehicle within a predetermined speed range and also disconnecting therebetween and connecting said second conduit to a reservoir so as to maintain the value of the fluid at an expected minimum value thereunder during operation of the vehicle exceeding the predetermined speed range, and means including a reducing valve for connecting said regulator valve and shift valve to permit the flow of fluid into one end of said shift valve and also for reducing a value of fluid pressure applied from the fluid sources, said reducing valve being provided with a first pressure receiving surface connected to said first conduit and a second pressure receiving surface connected to said second conduit and being operatively connected to said exhaust valve to modify the amount of said fluid to be reduced so that fluid under reducing pressure to be supplied to one end of said shift valve is proportioned to said first signal force.

3. A control mechanism in an automatic transmission for use in an automotive vehicle comprising:
a drive shaft,
a driven shaft,
means including hydraulically operable servomotors for establishing a power train between said drive and driven shafts,
at least two fluid sources for supplying fluid under pressure to said hydraulically operable servomotors,
means responsive to the vehicle driving speed connected to one of said shafts for providing fluid under pressure, a value of said pressure being increased with increase in value of the shaft speed,
a regulator valve including a valve piston having a plurality of opposed fluid pressure receiving surfaces and operable in such a manner as to regulate the pressure of fluid supplied from at least one of said fluid sources,
a first conduit connecting one of said fluid sources and one of the pressure receiving surfaces of said regulator valve to permit fluid from said source to press said valve piston in one direction upon application thereof,
a second conduit connecting between the rest of said fluid sources and another one of the pressure receiving surfaces of the regulator valve to permit fluid from said source to press the valve piston in the opposite direction upon application thereof, and
means for connecting between said first and second conduits so as to maintain a value of the fluid from said sources to said hydraulically operable servomotors at an expected maximum value under the influence of the fluid from said means responsive to the vehicle driving speed during operation of the vehicle within a predetermined speed range and also disconnecting therebetween and connecting said second conduit to a reservoir so as to maintain the value of the fluid at an expected minimum value thereunder during operation of the vehicle exceeding the predetermined speed range.

4. A control mechanism in an automatic transmission for use in an automotive vehicle comprising:
a drive shaft,
a driven shaft,
means including hydraulically operable servomotors for establishing a power train between said drive and driven shafts,
at least two fluid sources for supplying fluid under pressure to said hydraulically operable servomotors, a governor valve connected to one of said shafts for providing a first signal force, a value of which being increased with increase in value of the shaft speed,
means for providing a second signal force, a value of which being increased with increase in value of the required torque for said drive shaft,
a regulator valve having a valve piston therein formed with a plurality of opposed pressure receiving surfaces for regulating the pressure of fluid from at least one of the fluid sources,
a first conduit connecting between one of said fluid sources and one of the pressure receiving surfaces of said regulator valve to permit fluid from said source to press said valve piston in one direction upon application thereof,
a second conduit connecting between the rest of said fluid sources and another one of the pressure receiving surfaces of the regulator valve to permit fluid from said source to press the valve piston in the opposite direction upon application thereof, and
an exhaust valve for connecting between said first and second conduits so as to maintain a value of the fluid from said sources to said hydraulically operable servomotors at an expected maximum value under the influence of the first signal force and second signal force when the values of said signal forces are respectively within predetermined ranges and also disconnecting therebetween and connecting said second conduit to a reservoir so as to maintain the value of the fluid at an expected minimum value thereunder when they are respectively exceeding the predetermined ranges, whereby fluid under pressure to be supplied to said servomotors is controlled in value from the expected maximum to the expected minimum or from the expected minimum to the expected maximum in accordance with a value of the required torque for said drive shaft and the speed of said shafts.

5. A control mechanism in an automatic transmission for use in an automotive vehicle comprising:
a drive shaft,
a driven shaft,
means including hydraulically operable servomotors for establishing a power train between said drive and driven shafts,
at least two fluid sources for supplying fluid under pressure to said hydraulically operable servomotors,
a governor valve connected to one of said shafts for providing a first signal force, a value of which being increased with increase in value of the speed shaft,
means for providing a second signal force, a value of which being increased with increase in value of the required torque for said drive shaft,
a regulator valve having a valve piston therein formed with a plurality of opposed pressure receiving surfaces for regulating the pressure of fluid from at least one of the fluid sources,
a first conduit connecting between one of said fluid sources and one of the pressure receiving surfaces of said regulator valve to permit fluid from said source to press said valve piston in one direction upon application of the fluid thereto,
a second conduit connecting between the rest of said fluid sources and another one of the pressure receiving surfaces of the regulator valve to permit fluid from said source to press the valve piston in the opposite direction upon application of the fluid thereto,
an exhaust valve for modifying a value of fluid to be supplied from the fluid sources to the hydraulically operable servomotors with increase in value of the first signal force, said exhaust valve including a valve piston having two ends opposed to each other slidable therein between a first position and a second position in such a manner that, when said valve piston is in the first position, said first conduit and second conduit are communicated to each other and when said valve piston is in the second position, said second conduit is connected to a reservoir with disconnection between the first conduit and the second conduit so as to maintain a value of fluid less than a value thereof in the first position, and at this time the first signal force being applied on one end of the valve piston and the second signal force being applied on the other end thereof so as to change a shift point of a level of fluid pressure.

6. A control mechanism in an automatic transmission for use in an automotive vehicle comprising:
a drive shaft,
a driven shaft,
means including hydraulically operable servomotors for establishing a power train between said drive and driven shafts,
means for providing a first signal force, a value of which being variable in accordance with a value of a first signal,
means for providing a second signal force, a value of which being variable in accordance with a value of a second signal,
a fluid source for supplying fluid under pressure to said hydraulically operable servomotors,
a regulator valve for regulating the pressure of fluid from said fluid source under the influence of said first and second signal forces,
a reducing valve for providing a second fluid under pressure proportioned merely to a value of the second signal force by modifying in accordance with variation of a value of the first signal force a reduced amount of the fluid regulated by said regulator valve, and
a shift valve for automatically directing fluid from said fluid source to said servomotors, said shift valve including a valve piston having a first end to which the first signal force is applied so as to press said valve piston in one direction and a second end to which a second fluid under pressure is applied so as to press said valve piston in the opposite direction, whereby said shift valve is to be operated with variation of respective first and second signals.

7. A control mechanism in an automatic transmission for use in an automotive vehicle comprising:
a drive shaft,
a driven shaft,
means including hydraulically operable servomotors for establishing a power train between said drive shafts,
means for providing a first signal force, a value of which being varied in accordance with a value of the speed of one of said drive and driven shafts,
means for providing a second signal force, a value of which being varied in accordance with a value of the required torque for said drive shaft,
a fluid source for supplying fluid under pressure to said hydraulically operable servomotors,
a regulator valve for regulating the pressure of fluid from said fluid source under the influence of said first and second signal forces so as to render a value thereof to vary with variation of respective values of said first and second signal forces,
a reducing valve for providing a second fluid under pressure proportioned merely to a value of the second signal force by modifying in accordance with variation of a value of the first signal force a reduced amount of the fluid regulated by said regulator valve, and
shift valve for automatically directing fluid from said fluid source to said servomotors, said shift valve including a valve piston having a first end to which the first signal force is applied so as to press said valve piston in one direction and a second end to which a second fluid under pressure is applied so as to press said valve piston in the opposite direction, whereby said shift valve is to be operated with variation of respective values of the shaft speed and required torque for said shaft.

8. A control mechanism in an automatic transmission for use in an automotive vehicle comprising:
a drive shaft,
a driven shaft,
means including hydraulically operable servomotors, for establishing a power train between said drive and driven shafts,
means for providing a first signal force, a value of which being varied in accordance with a value of the speed of one of said drive and driven shafts,
means for providing a second signal force, a value of which being varied in accordance with variation of a value of the required torque for said drive shaft,
a fluid source for supplying fluid under pressure to said hydraulically operable servomotors therefrom,
a regulator drive including a valve piston which is capable of being operatively connected to said second mentioned means, said third mentioned means, and said fluid source respectively for modifying a value of fluid from said fluid source in accordance with variation of respective values of the first and second signal forces, said valve piston being provided with a first pressure receiving surface to which the fluid from said fluid source is supplied to press said valve piston in one direction and a second pressure receiving surface to which the first signal force is supplied to press the valve piston in the opposite direction,
a reducing valve having a valve piston therein and connected to said regulator valve so as to provide a second fluid under pressure by reducing said fluid under reduced pressure,
a third pressure receiving surface provided in the valve piston of the reducing valve and connected to said first mentioned means so as to modify an amount of reduction of said fluid under regulated pressure in accordance with variation of a value of said first signal force, to prevent a value of said second fluid under pressure from being varied with variation of a value of the first signal force, and to vary its value in response to variation of a value of the second signal force, and
a shift valve for automatically directing fluid under regulated pressure from said fluid source to said servomotors, said shift valve including a valve piston provided with a first end to which the first signal force is applied so as to press said valve piston in one direction and a second end to which a second fluid under pressure is applied so as to press said valve piston in the opposite direction, whereby said shift valve is to be operated with variation of respective values of the shaft speed and required torque for said shaft.

9. A control mechanism in an automatic transmission for use in an automotive vehicle comprising:
a drive shaft,
a driven shaft,
means including hydraulically operable servomotors for establishing a power train between said drive and driven shaft,
means for providing a first signal force, a value of which being varied in accordance with a value of the speed of one of said drive and driven shafts,
means connected to an intake manifold in the engine for providing a second signal force, a value of which being varied in accordance with variation of a value of the required torque for said drive shaft,
a fluid source for supplying fluid under pressure to said servomotors,
a regulator valve hydraulically connected to said second mentioned means and mechanically connected to said third mentioned means and having a valve piston operable so as to modify a value of fluid under pressure from said fluid source in accordance with variation of respective values of the first signal force and the second signal force,
a first pressure receiving surface on said valve piston for pressing said valve piston in one direction upon application of the first signal force thereto, a reducing valve having a valve piston therein and connected to said regulator valve for providing a second fluid under pressure by reducing a value of said fluid under regulated pressure, a second pressure receiving surface on said valve piston of said reducing valve and connected to said second mentioned means so as to modify an amount of reduction of said fluid under regulated pressure in accordance with variation of a value of said first signal force, to prevent a value of said second fluid from being varied with variation of a value of the first signal force, and to vary its value in response to variation of a value of the second signal force, and a shift valve for automatically directing said fluid under regulated pressure from the fluid source to the servomotors, said shift valve including a valve piston provided with a first end to which the first signal force is applied so as to press said valve piston in one direction and a second end to which the second fluid is applied so as to press said valve piston in the opposite direction, whereby said shift valve is to be operated with variation of respective values of the shaft speed and required torque for said shaft.

10. A control mechanism in an automatic transmission for use in an automotive vehicle comprising:
a drive shaft,
a driven shaft,
means including a servomotors for establishing a power train between said drive and driven shafts,
a fluid source for supplying a first fluid under pressure to said servomotors,
a shift valve having a valve piston therein for automatically directing said first fluid under pressure from the fluid source to said servomotors,
means hydraulically connected to one end of said valve piston for providing a second fluid under pressure so as to press said valve piston in one direction, a value of said second fluid being variable in accordance with the speed of one of said drive and driven shafts,
means connected to an intake manifold in the engine for providing a third fluid under pressure, a value of which being varied with variation of a value of negative pressure therein,
a second valve for providing a fourth fluid under pressure by reducing a value of said third fluid under pressure in a predetermined value,
means for reducing the amount of reduction of said fourth fluid in accordance with increase of a value of the third fluid exceeding the predetermined value, and
means for connecting said second valve to said shift valve so as to press said valve piston of said shift valve in the opposite direction by said fourth fluid under pressure.

11. A control mechanism in an automatic transmission for use in an automotive vehicle comprising:
a drive shaft,
a driven shaft,
means including servomotors for establishing a power train between said drive and driven shafts,
a fluid source for supplying a first fluid under pressure to said servomotors,
a shift valve including a valve piston therein for automatically directing said first fluid from the fluid source to the servomotors,
means hydraulically connected to one of said valve piston for providing a second fluid under pressure so as to press said valve piston in one direction, a value of said second fluid being variable in accordance with the speed of one of said drive and driven shafts,
means connected to an intake manifold in the engine for providing a third fluid under pressure, a value of which being varied with variation in value of negative pressure therein,
a second valve for providing a fourth fluid under pressure by reducing a value of said third fluid under pressure in a predetermined value, said second valve including a valve element urged in one direction by a spring,
means for controlling the biasing of said valve element to reduce an amount of reduction of said fourth fluid in accordance with an increase of the third fluid when a value of said third fluid exceeds the predetermined value, and
means for connecting said second valve to said shift valve so as to press said valve piston of said shift valve in the opposite direction by said fourth fluid under pressure.

12. A control mechanism in an automatic transmission for use in an automotive vehicle comprising:
a drive shaft,
a driven shaft,
means including servomotors for establishing a power train between said drive and driven shafts,
a fluid source for supplying a first fluid under pressure to said servomotors,
a shift valve including a valve piston therein for automatically directing said first fluid from the fluid source to said servomotors,
means hydraulically connected to one end of said valve piston for providing a second fluid under pressure so as to press said valve piston in one direction, a value of said second fluid being variable in accordance with the speed of one of said drive and driven shafts,
means connected to an intake manifold in the engine for providing a third fluid under pressure, a value of which being varied with variation in value of negative pressure therein,
a second valve for providing a fourth fluid under pressure by reducing a value of said third fluid under pressure in a predetermined value, said second valve including a valve element urged in one direction by a spring,
means including a plug having a pressure receiving surface and connected to said second valve so as to press said plug in one direction against the resilient force of the spring, said plug being operable to reduce the biasing force of said valve element while increasing an amount of compression of said second spring in accordance with increase in value of the third fluid under pressure when a value of the fourth fluid under pressure acting on said pressure receiving surface exceeds the predetermined value, whereby, when a value of the third fluid under pressure exceeds the predetermined value, the fourth fluid under pressure is reduced with respect to its difference to that of the third fluid in accordance with an increase in value of the third fluid, and
means for connecting said second valve to said shift valve so as to press said valve piston of said shift valve in the opposite direction by said fourth fluid under pressure.

13. A control mechanism in an automatic transmission for use in an automotive vehicle comprising:
a drive shaft,
a driven shaft,
a fluid source,
means including a plurality of servomotors for establishing a plurality of power trains between said drive and driven shafts in such a manner as to establish a first power train therebetween by means of a first servomotor and second servomotor and also to establish a second power train therebetween by means of a third servomotor and said second servomotor,
a manual valve having a valve piston movable to selectively position in a first position in which said first power train can be established and in a second position in which said second power train can be established,
a first conduit for connecting between the fluid source and said second servomotor when said manual valve piston is in the first position and also connecting between said second servomotor and an oil reservoir when said manual valve piston is in the second position,
a second conduit for connecting between said second servomotor and the fluid source when the manual valve piston is in the first position and the second position, said second conduit having a first restriction for restricting the flow of fluid to the second servomotor, and a branch conduit for connecting said first conduit to said second conduit between said first restriction and said second servomotor, said branch conduit having a second restriction for discharging a portion of the fluid flowing to said second servomotor to said reservoir when the manual valve piston is in the second position, whereby a value of fluid to be supplied to the second servomotor when said manual valve piston is in the first position is greater than that when in the second position.

14. A control mechanism in an automatic transmission for use in an automotive vehicle comprising:

a drive shaft,
a driven shaft,
a fluid source,
means including a plurality of servomotors for establishing a plurality of power trains between said drive and driven shafts in such a manner as to establish a reverse drive power train therebetween by means of a first servomotor and second servomotor and also to establish a low speed forward drive power train therebetween by means of a third servomotor and said second servomotor,
a manual valve having a valve piston movable to selectively position in a first position in which said reverse drive power train can be established and in a second position in which said low speed forward drive power train can be established,
a first conduit for connecting between the fluid source and the second servomotor when said manual valve piston is in the first position and also connecting between said second servomotor to an oil reservoir when said manual valve piston is in the second position,
a second conduit for connecting between the second servomotor and the fluid source when the manual valve piston is in the first position and the second position, said conduit having a first restriction for restricting the flow of fluid to the second servomotor, and
a branch conduit for connecting said first conduit to said second conduit between said first restriction and said second servomotor, said branch conduit having a second restriction for discharging a portion of the fluid flowing to said second servomotor to said reservoir when the manual valve piston is in the second position, whereby a value of fluid to be supplied to the second servomotor when said manual valve piston is in the first position is greater than that when in the second position.